United States Patent
Okamoto et al.

(10) Patent No.: US 10,082,035 B2
(45) Date of Patent: Sep. 25, 2018

(54) EROSION RESISTANT MATERIAL AND TURBINE BLADE

(71) Applicant: Kabushiki Kaisha Toshiba, Minato-ku (JP)

(72) Inventors: Tetsushi Okamoto, Kawasaki (JP); Fumio Sawa, Sumida (JP); Takashi Harakawa, Yokohama (JP); Kenichi Yamazaki, Yokohama (JP); Hiroaki Cho, Fuchu (JP); Naoki Shibukawa, Saitama (JP); Tadayuki Hashidate, Sagamihara (JP); Yoshihiro Hyodo, Yokohama (JP); Akira Tanaka, Yokohama (JP); Masamitsu Sakuma, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/052,003

(22) Filed: Feb. 24, 2016

(65) Prior Publication Data

US 2016/0169009 A1    Jun. 16, 2016

Related U.S. Application Data

(63) Continuation of application No. PCT/JP2014/004439, filed on Aug. 28, 2014.

(30) Foreign Application Priority Data

Aug. 30, 2013 (JP) .................. 2013-179982
Aug. 20, 2014 (JP) .................. 2014-167352

(51) Int. Cl.
*F01D 5/28* (2006.01)
*C09D 5/08* (2006.01)
(Continued)

(52) U.S. Cl.
CPC ............ *F01D 5/288* (2013.01); *B22F 7/02* (2013.01); *C08K 3/013* (2018.01); *C08L 63/00* (2013.01);
(Continued)

(58) Field of Classification Search
None
See application file for complete search history.

(56) References Cited

U.S. PATENT DOCUMENTS 5,266,610 A * 11/1993 Malhotra ................. C08K 9/08
                                                          428/407
5,270,364 A   12/1993 Schwartz et al.
(Continued)

FOREIGN PATENT DOCUMENTS

CA    2 683 848 A1   10/2008
CA    2 697 120 A1    9/2010
(Continued)

OTHER PUBLICATIONS

International Search Report dated Nov. 18, 2014 in PCT/JP2014/004439, filed Aug. 28, 2014 (with English Translation).
(Continued)

*Primary Examiner* — Ronak C Patel
(74) *Attorney, Agent, or Firm* — Oblon, McClelland, Maier & Neustadt, L.L.P.

(57) ABSTRACT

An erosion resistant material has a continuous portion and discontinuous portions. The continuous portion has a continuous structure. The discontinuous portions are arranged inside the continuous portion to have a discontinuous structure. The discontinuous portions are formed of particles having an average particle diameter of 1 μm or less. Further, the discontinuous portions are formed of a material having a surface hardness and a Young's modulus higher than those of the continuous portion.

10 Claims, 6 Drawing Sheets

(51) Int. Cl.
*B22F 7/02* (2006.01)
*C08L 63/00* (2006.01)
*C08K 3/013* (2018.01)
*C08K 3/08* (2006.01)
*C08K 3/22* (2006.01)

(52) U.S. Cl.
CPC ...... *C09D 5/084* (2013.01); *C08K 2003/0856* (2013.01); *C08K 2003/2227* (2013.01); *F05D 2220/30* (2013.01); *F05D 2230/90* (2013.01); *F05D 2300/11* (2013.01); *F05D 2300/121* (2013.01); *F05D 2300/13* (2013.01); *F05D 2300/133* (2013.01); *F05D 2300/16* (2013.01); *F05D 2300/21* (2013.01); *F05D 2300/211* (2013.01); *F05D 2300/2112* (2013.01); *F05D 2300/222* (2013.01); *F05D 2300/431* (2013.01); *F05D 2300/44* (2013.01); *F05D 2300/501* (2013.01); *F05D 2300/506* (2013.01); *F05D 2300/51* (2013.01); *F05D 2300/603* (2013.01); *F05D 2300/609* (2013.01); *F05D 2300/611* (2013.01); *F05D 2300/614* (2013.01); *Y02T 50/672* (2013.01)

(56) References Cited

U.S. PATENT DOCUMENTS

| | | | |
|---|---|---|---|
| 7,753,653 B2 | 7/2010 | Cairo et al. | |
| 8,035,569 B2 | 10/2011 | Maruko et al. | |
| 8,067,086 B2 | 11/2011 | Stamm et al. | |
| 2003/0080477 A1* | 5/2003 | Merrill | B28B 1/265 264/637 |
| 2003/0162648 A1* | 8/2003 | Middlemiss | C04B 35/628 428/698 |
| 2005/0142353 A1 | 6/2005 | Buczek et al. | |
| 2007/0099027 A1 | 5/2007 | Krishnamurthy et al. | |
| 2007/0101719 A1 | 5/2007 | Niizeki et al. | |
| 2007/0231542 A1* | 10/2007 | Deng | B08B 17/06 428/141 |
| 2008/0051524 A1* | 2/2008 | Ji | C08L 63/00 525/476 |
| 2009/0202814 A1* | 8/2009 | Jabado | C23C 30/00 428/325 |
| 2010/0120936 A1* | 5/2010 | Lamon | B29C 44/022 521/178 |
| 2010/0148396 A1 | 6/2010 | Xie et al. | |
| 2010/0249277 A1 | 9/2010 | Fang et al. | |
| 2011/0039108 A1* | 2/2011 | Goeb | C09J 163/00 428/414 |
| 2015/0175755 A1* | 6/2015 | Sekharan | C08J 5/04 523/222 |

FOREIGN PATENT DOCUMENTS

| | | |
|---|---|---|
| CN | 1971001 | 5/2007 |
| CN | 101220818 | 7/2008 |
| CN | 101410552 | 4/2009 |
| CN | 101501932 | 8/2009 |
| CN | 101876327 A | 11/2010 |
| EP | 1 780 379 A2 | 5/2007 |
| EP | 1 840 245 A1 | 10/2007 |
| EP | 1 947 346 A1 | 7/2008 |
| EP | 2 051 330 A1 | 4/2009 |
| EP | 2226409 A2 | 9/2010 |
| EP | 2 236 549 A1 | 10/2010 |
| EP | 2290194 A3 | 7/2013 |
| JP | 9-41096 | 2/1997 |
| JP | 10-502714 | 3/1998 |
| JP | 2001-205738 | 7/2001 |
| JP | 2002-239452 | 8/2002 |
| JP | 2007-120478 | 5/2007 |
| JP | 2008-169844 | 7/2008 |
| JP | 2009-1635 | 1/2009 |
| JP | 2009-126939 | 6/2009 |
| JP | 2009-531543 | 9/2009 |
| JP | 2010-531244 | 9/2010 |
| JP | 2010-242083 | 10/2010 |
| JP | 2011-524444 | 9/2011 |
| WO | 2007/075497 A3 | 7/2007 |
| WO | WO 2008/018179 A1 | 2/2008 |
| WO | 2010/051803 A1 | 5/2010 |

OTHER PUBLICATIONS

Written Opinion dated Nov. 18, 2014 in PCT/JP2014/004439, filed Aug. 28, 2014.
English translation of the International Preliminary Report on Patentability and Written Opinion dated Mar. 10, 2016 in PCT/JP2014/004439 filed Aug. 28, 2014.
Extended European Search Report dated Mar. 24, 2017 I n European Application No. 14840385.0.
Office Action dated May 22, 2017 in Korean Application No. 2016-7003488, along with an English translation.
Combined Office Action and Search Report dated Jan. 4, 2018 in Chinese Patent Application No. 201480047764.4, 12 pages.
Office Action dated Jan. 9, 2018 in Japanese Patent Application No. 2014-167352 with English translation.

\* cited by examiner

US 10,082,035 B2

EROSION RESISTANT MATERIAL AND TURBINE BLADE

CROSS-REFERENCE TO RELATED APPLICATIONS

This application is a continuation of prior International Application No. PCT/JP2014/004439 filed on Aug. 28, 2014 which is based upon and claims the benefit of priority from Japanese Patent Applications Nos. 2013-179982 filed on Aug. 30, 2013 and 2014-167352 filed on Aug. 20, 2014; the entire contents of all of which are incorporated herein by reference.

TECHNICAL FIELD

Embodiments described herein relate generally to an erosion resistant material and a turbine blade.

BACKGROUND ART

Conventionally, a metal material has been used under an environment in which collision of particles made of solid or liquid occurs at a high speed. Meanwhile, in a transport equipment such as an aircraft, an automobile, or a railroad, a fiber reinforced plastic reinforced by carbon fibers, glass fibers, or the like, has been used for realizing weight reduction in order to achieve energy saving.

The fiber reinforced plastic can realize the weight reduction. However, when a particle made of solid or liquid collides with the fiber reinforced plastic at a high speed, the fiber or the plastic is eroded, and characteristics are easily deteriorated. Accordingly, there has been proposed a method in which a reinforcing material such as a metal material or a ceramic material is arranged on a surface which is subjected to erosion.

However, in the method in which the reinforcing material is arranged on the surface, the weight reduction is sacrificed. Further, when the reinforcing material on the surface is eroded, the deterioration of characteristics easily progresses.

DETAILED DESCRIPTION

Figure 1:
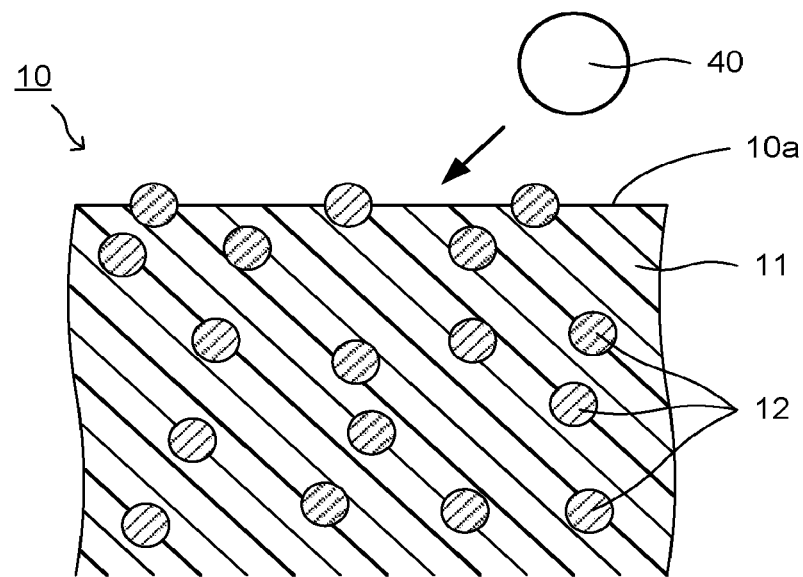
FIG. 1 is a sectional view illustrating one example of an erosion resistant material of a first embodiment.

Hereinafter, embodiments of an erosion resistant material will be described while referring to the drawings.

An erosion resistant material of a first embodiment has a continuous portion and discontinuous portions. The continuous portion has a continuous structure. The discontinuous portions are arranged inside the continuous portion to have a discontinuous structure. The discontinuous portions are formed of particles having an average particle diameter of 1 μm or less. Further, the discontinuous portions are formed of a material having a surface hardness and a Young's modulus higher than those of the continuous portion.

An erosion resistant material of a second embodiment has a continuous portion and discontinuous portions. The continuous portion has a continuous structure. The discontinuous portions are arranged inside the continuous portion to have a discontinuous structure. The discontinuous portions are formed of particles having an average particle diameter of 20 μm or less. Further, the discontinuous portions are formed of a material having a surface hardness and a Young's modulus lower than those of the continuous portion.

An erosion resistant material of a third embodiment has a resin material portion. A resin material which forms the resin material portion has a hydrophilic group. Further, a water droplet contact angle on a surface of the resin material which forms the resin material portion is 80 degrees or less.

First, an erosion resistant material of a first embodiment will be described.

FIG. 1 is a sectional view illustrating one example of the erosion resistant material of the first embodiment.

Note that FIG. 1 also illustrates a colliding particle 40 which collides with an erosion resistant material 10.

The erosion resistant material 10 of the first embodiment has a continuous portion 11 and discontinuous portions 12. The continuous portion 11 is one having a continuous structure, and becoming a matrix of the erosion resistant material 10. The discontinuous portions 12 are arranged inside the continuous portion 11.

The discontinuous portions 12 are arranged inside the continuous portion 11 to have a discontinuous structure. The discontinuous portions 12 are formed of particles having an average particle diameter of 1 μm or less. Further, the discontinuous portions 12 are formed of a material having a surface hardness and a Young's modulus higher than those of the continuous portion 11.

Here, the discontinuous structure means that particles are not brought into contact with one another. However, it is not always necessary to satisfy a level up to one at which all particles are not brought into contact with one another. For example, some particles may be brought into contact with one another. The discontinuous structure as above is formed in a manner that particles are dispersed to be arranged, and the continuous portion 11 is interposed among these particles.

According to the erosion resistant material 10 of the present embodiment, since the material has the above-described continuous portion 11 and discontinuous portions 12, the weight reduction becomes realizable, and in addition to that, the erosion resistance becomes good.

For example, a general resin material has low surface hardness and Young's modulus. If the above-described resin material is employed, when an incident angle of a colliding particle is large, impact of the colliding particle is absorbed to suppress erosion, because of the low Young's modulus. However, when the incident angle of the colliding particle is small, the material is easily eroded so as to be scratched, due to the low surface hardness. Here, the case where the incident angle of the colliding particle is large indicates a case where the colliding particle is incident on a surface at an angle close to a vertical angle. Further, the case where the incident angle of the colliding particle is small indicates a case where the colliding particle is incident on the surface so as to rub the surface.

On the contrary, if a material having high surface hardness and Young's modulus is employed, when an incident angle of a colliding particle is small, erosion such as one formed by scratching is suppressed, because of the high surface hardness. However, when the incident angle of the colliding particle is large, erosion easily occurs since the Young's modulus is high and thus impact is not sufficiently absorbed.

According to the erosion resistant material 10 of the present embodiment, the continuous portion 11 formed of the material whose surface hardness and Young's modulus are relatively low, and the discontinuous portions 12 formed of the material whose surface hardness and Young's modulus are relatively high, are properly arranged. This suppresses the erosion, regardless of the magnitude of the incident angle of the colliding particle 40.

For example, when the incident angle of the colliding particle 40 is small, the colliding particle 40 collides with the discontinuous portion 12 so as to rub the portion. Here, the discontinuous portion 12 is formed of the material whose surface hardness and Young's modulus are relatively high. This suppresses the erosion such as one formed by scratching. On the other hand, when the incident angle of the colliding particle 40 is large, even if the colliding particle 40 collides with the discontinuous portion 12, the impact applied to the discontinuous portion 12 is absorbed by the continuous portion 11. Here, the continuous portion 11 is formed of the material whose surface hardness and Young's modulus are relatively low. This suppresses both of the erosion such as one formed by scratching caused when the incident angle of the colliding particle 40 is small, and the erosion caused by the impact when the incident angle of the colliding particle 40 is large. Specifically, the erosions are suppressed regardless of the magnitude of the incident angle of the colliding particle 40.

Here, the effect of absorbing the impact becomes prominent when a particle diameter of the particle forming the discontinuous portion 12 is sufficiently small, when compared to a particle diameter of the colliding particle 40. As the colliding particle 40, there can be cited one formed of solid or liquid. As a typical example of the colliding particle 40, water droplets having an average particle diameter of about 200 µm can be cited. In the erosion resistant material 10 of the present embodiment, by setting the average particle diameter of the particles forming the discontinuous portions 12 to be sufficiently small to be 1 µm or less, the erosion caused by the impact is effectively suppressed. The average particle diameter of the particles forming the discontinuous portions 12 is preferably 500 nm or less, and more preferably 300 nm or less. Although a lower limit value of the average particle diameter is not necessarily limited, it is normally about 1 nm.

Further, the effect of absorbing the impact can be obtained when the particles forming the discontinuous portions 12 are not brought into contact with one another. In the erosion resistant material 10 of the present embodiment, by providing the discontinuous structure in which the particles are not brought into contact with one another, the erosion caused by the impact is effectively suppressed. Theoretically speaking, if a proportion, by volume, of the continuous portion 11 in the continuous portion 11 and the discontinuous portions 12 becomes one-third or more, there is created a continuous state where the particles forming the discontinuous portions 12 are brought into contact with one another.

Further, according to the erosion resistant material 10 of the present embodiment, it is possible to use the resin material as the composing material of the continuous portion 11. This makes it possible to realize the weight reduction.

In addition, according to the erosion resistant material 10 of the present embodiment, the material has the continuous portion 11 and the discontinuous portions 12 as a whole. Consequently, even if the colliding particle 40 tentatively collides with the material and a surface 10a is shaved, surfaces each having a similar structure appear one after another, resulting in that the reduction in the erosion resistance is suppressed.

Note that the average particle diameter, the surface hardness, and the Young's modulus can be measured in the following manner. The average particle diameter can be measured by a laser diffraction method. The surface hardness can be measured regarding bulk goods made of materials forming respective portions. In the measurement of the surface hardness, it is possible to use hardness meters in accordance with the materials. For example, regarding a soft material such as the material forming the continuous portion 11, it is possible to use a Rockwell hardness meter. Regarding a hard material such as the material forming the discontinuous portion 12, it is possible to use a Vickers hardness meter. Regarding a rubber material, it is possible to use a durometer. The Young's modulus can be measured using a test piece specified in JISG0567J by using a tensile tester.

The surface hardness of the material forming the continuous portion 11 is, based on the Rockwell hardness (M scale), preferably 130 or less, more preferably 120 or less, still more preferably 110 or less, and particularly preferably 100 or less. Although a lower limit value of the surface hardness of the material forming the continuous portion 11 is not necessarily limited, it is normally about 60 based on the Rockwell hardness (M scale).

The Young's modulus of the material forming the continuous portion 11 is preferably 20 GPa or less, more preferably 10 GPa or less, and still more preferably 5 GPa or less. When the Young's modulus is within the above-described range, the impact applied to the discontinuous portion 12 by the colliding particle 40 is absorbed, resulting in that the erosion resistance becomes good. Although a lower limit value of the Young's modulus of the material forming the continuous portion 11 is not necessarily limited, it is normally about 100 MPa.

As the material forming the continuous portion 11, a resin material is preferable. As the resin material, one containing at least one kind selected from an epoxy resin, a phenol resin, a polyimide resin, and a polyester imide resin, is preferable. As the resin material, one containing the epoxy resin is particularly preferable. Note that it is also possible that the resin material contains a curing agent, a dispersion medium, a leveling agent, a defoaming agent, a pigment, or the like, according to need.

As the epoxy resin, for example, there can be cited one obtained through condensation between epichlorohydrin and polyhydric phenols such as bisphenols or polyhydric alcohol. Concretely, there can be cited a bisphenol A type epoxy resin, a brominated bisphenol A type epoxy resin, a hydro-generated bisphenol A type epoxy resin, a bisphenol F type epoxy resin, a bisphenol S type epoxy resin, a bisphenol AF type epoxy resin, a biphenyl type epoxy resin, a naphthalene type epoxy resin, a fluorene type epoxy resin, a novolac type epoxy resin, a phenol novolac type epoxy resin, an ortho-cresol novolac type epoxy resin, a tris (hydroxyphenyl) methane type epoxy resin, and the like. Further, there can be cited a glycidyl ester type epoxy resin obtained through condensation between a glycidyl ether type epoxy resin such as a tetraphenylolethane type epoxy resin or epichlorohydrin and carboxylic acid, a heterocyclic epoxy resin such as a hydantoin type epoxy resin obtained through reaction between triglycidyl isocyanate or epichlorohydrin and hydantoins, and the like.

A water droplet contact angle on a surface of the resin material which forms the continuous portion 11 is preferably 80 degrees or less. When the water droplet contact angle on the surface of the resin material is 80 degrees or less, the erosion resistance is further improved. The water droplet contact angle as above is obtained when, for example, the resin material contains a hydrophilic group. As the hydrophilic group, there can be cited, for example, a hydroxyl group, an amino group, a carboxyl group, a sulfo group, and an amide group. The effect as above is demonstrated particularly when the colliding particle 40 is a water droplet.

The hydrophilic group is introduced into the resin material by using, for example, a resin containing the hydrophilic group, as the resin used for manufacturing the resin material. The resin containing the hydrophilic group is only required to contain at least one hydrophilic group in a molecule, and when the resin contains recurring units in the molecule, it is preferable that each of the recurring units contains at least one hydrophilic group.

In the erosion resistant material 10, it is more preferable that the water droplet contact angle on the surface 10a with which the colliding particle 40 collides, is 80 degrees or less. To set the water droplet contact angle on the surface 10a to 80 degrees or less, further improves the erosion resistance. Here, the surface 10a is a surface having the continuous portion 11 and the discontinuous portions 12.

The surface hardness of the material forming the discontinuous portions 12 is, based on the Vickers hardness, preferably 700 or more, and more preferably 1000 or more. As the surface hardness of the material forming the discontinuous portions 12 becomes high, the erosion such as one formed by scratching caused when the incident angle of the colliding particle 40 is small is suppressed. Although an upper limit value of the surface hardness of the material forming the discontinuous portions 12 is not necessarily limited, it is normally about 2500.

The Young's modulus of the material forming the discontinuous portions 12 is preferably 50 GPa or more, more preferably 100 GPa or more, and still more preferably 300 GPa or more. Although an upper limit value of the Young's modulus of the material forming the discontinuous portions 12 is not necessarily limited, it is normally about 500 GPa.

As the composing material of the discontinuous portions 12, a metal material, a ceramic material, or a composite material of the metal material and the ceramic material, is preferable. As the metal material, one formed of at least one kind selected from iron, copper, aluminum, titanium, and tungsten, is preferable. As the ceramic material, one formed of at least one kind selected from aluminum oxide, titanium oxide, tungsten oxide, and layered silicate mineral, is preferable.

A content proportion of the discontinuous portions 12, in the total of the continuous portion 11 and the discontinuous portions 12, is preferably 1 vol % or more. When the content proportion of the discontinuous portions 12 is 1 vol % or more, the erosion such as one formed by scratching by the colliding particle 40 with small incident angle is effectively suppressed. The content proportion of the discontinuous portions 12 is more preferably 5 vol % or more, still more preferably 10 vol % or more, yet more preferably 15 vol % or more, even more preferably 20 vol % or more, and particularly preferably 25 vol % or more, since the erosion such as one formed by scratching is suppressed.

On the other hand, when the content proportion of the discontinuous portions 12 becomes high, the erosion such as one formed by scratching by the colliding particle 40 with small incident angle, is not suppressed anymore, and on the contrary, the erosion is apt to occur due to the impact of the colliding particle 40 with large incident angle. For this reason, the content proportion of the discontinuous portions 12, in the total of the continuous portion 11 and the discontinuous portions 12, is preferably 40 vol % or less, more preferably 35 vol % or less, and still more preferably 30 vol % or less.

Figure 2:
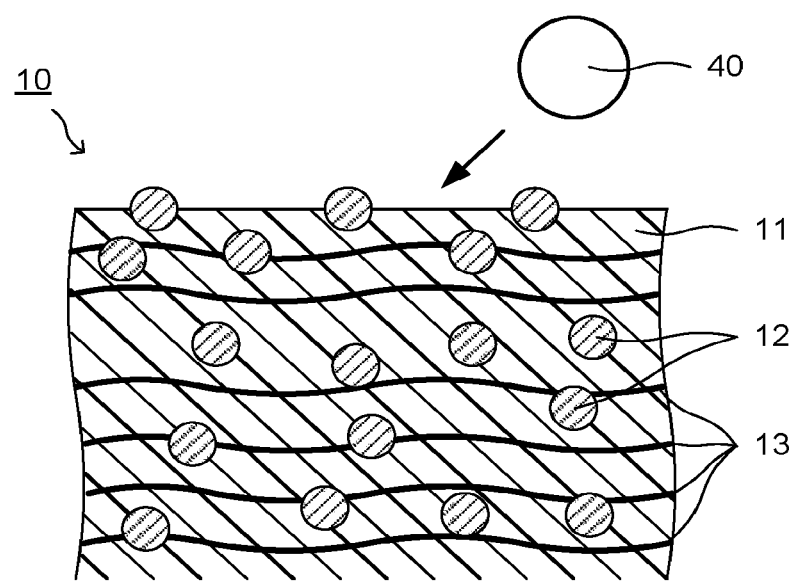
FIG. 2 is a sectional view illustrating a modified example of the erosion resistant material of the first embodiment.

FIG. 2 is a sectional view illustrating a modified example of the erosion resistant material 10.

The erosion resistant material 10 may also contain fibers 13. For example, in a case of a structural member, it is preferable that the structural member itself has sufficient mechanical strength. For this reason, when the erosion resistant material 10 is used as the structural member, it is preferable that the fibers 13 are contained in the material for securing the mechanical strength. The fibers 13 are contained in a state of a base material formed of a woven or non-woven fabric, for example. As a material forming the fiber 13, there can be cited a glass fiber, a carbon fiber, and a polymer fiber, for example. A length of the fiber 13 can be appropriately changed in accordance with a size of the material and the like.

When the fibers 13 are contained, a content proportion of the fibers can be appropriately selected in accordance with the mechanical strength to be required, and the like. Normally, the content proportion of the fibers 13 in the whole erosion resistant material 10, is preferably 50 vol % or more, more preferably 60 vol % or more, and still more preferably 70 vol % or more. On the other hand, when the content proportion of the fibers 13 is increased, the content proportion of the continuous portion 11 and the discontinuous portions 12 is relatively decreased, resulting in that the erosion resistance is lowered. For this reason, the content proportion of the fibers 13 in the whole erosion resistant material 10, is preferably 99 vol % or less, and more preferably 95 vol % or less.

Note that the proportion by volume of each of the continuous portion 11, the discontinuous portions 12, and the fibers 13, contained in the erosion resistant material 10, is determined by dividing the proportion by mass of each of the continuous portion 11, the discontinuous portions 12, and the fibers 13, contained in the erosion resistant material 10, by specific gravity of each of the elements.

Figure 3:
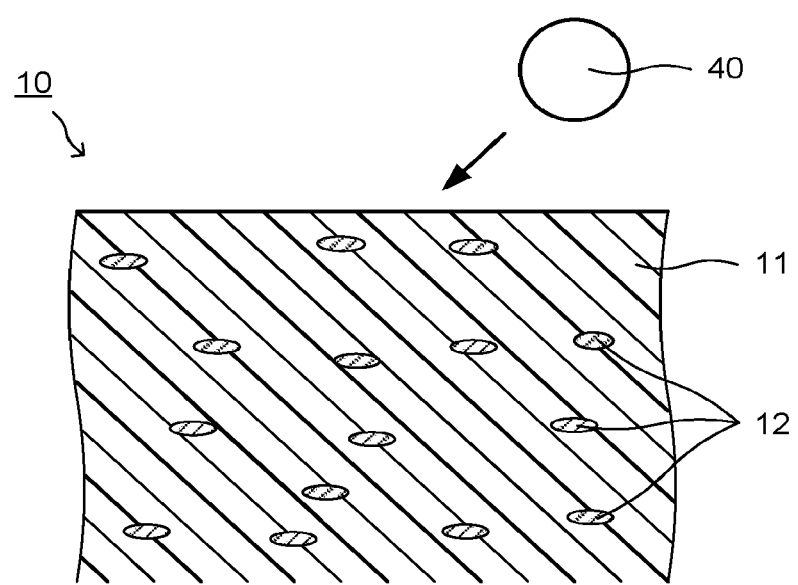
FIG. 3 is a sectional view illustrating another modified example of the erosion resistant material of the first embodiment.

FIG. 3 is a sectional view illustrating another modified example of the erosion resistant material 10.

The particle which forms the discontinuous portion 12 is not necessarily limited to a spherical one, and it may also be one with a flat plate shape, a column shape, or the like in which an average aspect ratio is greater than 1. When a particle having an average aspect ratio of greater than 1 is employed, bonding strength between the continuous portion 11 and the discontinuous portion 12 is improved, resulting in that the erosion caused by the impact when the incident angle of the colliding particle 40 is large, is particularly suppressed.

An average aspect ratio of the particles forming the discontinuous portions 12 is preferably 5 or more, and more preferably 10 or more. Note that the average aspect ratio of the particles forming the discontinuous portions 12 can be determined through SEM and TEM observations.

Figure 4:
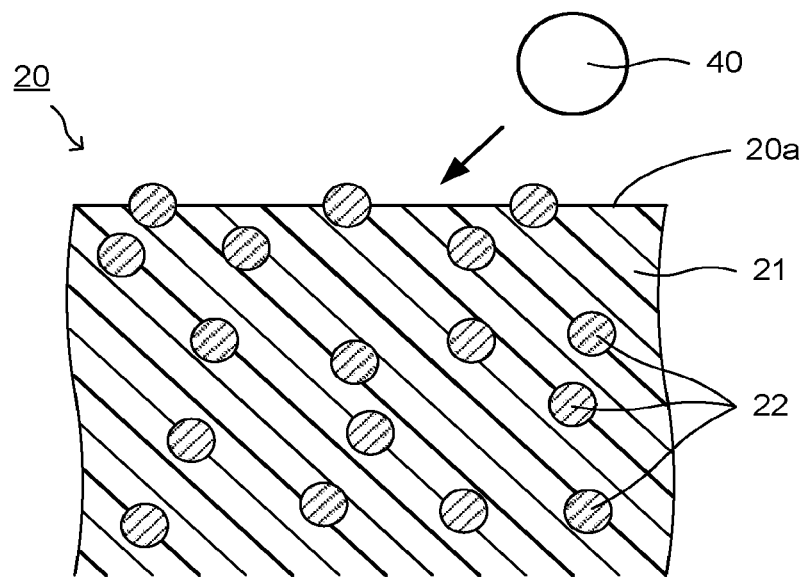
FIG. 4 is a sectional view illustrating one example of an erosion resistant material of a second embodiment.

Next, an erosion resistant material of a second embodiment will be described. FIG. 4 is a sectional view illustrating one example of an erosion resistant material 20 of the second embodiment.

The erosion resistant material 20 of the second embodiment has a structure which is approximately similar to that of the erosion resistant material 10 of the first embodiment, except that magnitude relations of the surface hardness and the Young's modulus between a continuous portion 21 and discontinuous portions 22 are reversed.

Specifically, the erosion resistant material 20 has the continuous portion 21 and the discontinuous portions 22. The continuous portion 21 is one having a continuous structure, and becoming a matrix of the erosion resistant material 20. The discontinuous portions 22 are arranged inside the continuous portion 21 to have a discontinuous structure. The discontinuous portions 22 are formed of particles having an average particle diameter of 20 µm or less. Further, the discontinuous portions 22 are formed of a material having the surface hardness and the Young's modulus lower than those of the continuous portion 21.

As described above, even in a case where the discontinuous portions 22 are formed of the material having the surface hardness and the Young's modulus lower than those of the continuous portion 21, the erosion resistance becomes good, in a similar manner to the case where the discontinuous portions 22 are formed of the material having the surface hardness and the Young's modulus higher than those of the continuous portion 21.

The surface hardness of the material forming the continuous portion 21 is, based on the Rockwell hardness (M scale), preferably 80 or more, more preferably 90 or more, and still more preferably 100 or more. Although an upper limit value of the surface hardness of the material forming the continuous portion 21 is not necessarily limited, it is normally about 130 based on the Rockwell hardness (M scale).

The Young's modulus of the material forming the continuous portion 21 is preferably 1 GPa or more, more preferably 2 GPa or more, still more preferably 3 GPa or more, and it may also be 10 GPa or more. Although an upper limit value of the Young's modulus of the material forming the continuous portion 21 is not necessarily limited, it is normally about 50 GPa.

As the material forming the continuous portion 21, a resin material is preferable. As the resin material, one containing at least one kind selected from an epoxy resin, a phenol resin, a polyimide resin, and a polyester imide resin, is preferable. As the resin material, one containing the epoxy resin is particularly preferable. Note that it is also possible that the resin material as above contains a curing agent, a dispersion medium, a leveling agent, a defoaming agent, a pigment, or the like, according to need.

As the epoxy resin, for example, there can be cited one obtained through condensation between epichlorohydrin and polyhydric phenols such as bisphenols or polyhydric alcohol. Concretely, there can be cited a bisphenol A type epoxy resin, a brominated bisphenol A type epoxy resin, a hydro-generated bisphenol A type epoxy resin, a bisphenol F type epoxy resin, a bisphenol S type epoxy resin, a bisphenol AF type epoxy resin, a biphenyl type epoxy resin, a naphthalene type epoxy resin, a fluorene type epoxy resin, a novolac type epoxy resin, a phenol novolac type epoxy resin, an ortho-cresol novolac type epoxy resin, a tris (hydroxyphenyl) methane type epoxy resin, and the like. Further, there can be cited a glycidyl ester type epoxy resin obtained through condensation between a glycidyl ether type epoxy resin such as a tetraphenylolethane type epoxy resin or epichlorohydrin and carboxylic acid, a heterocyclic epoxy resin such as a hydantoin type epoxy resin obtained through reaction between triglycidyl isocyanate or epichlorohydrin and hydantoins, and the like.

A water droplet contact angle on a surface of the resin material which forms the continuous portion 21 is preferably 80 degrees or less. When the water droplet contact angle on the surface of the resin material is 80 degrees or less, the erosion resistance is further improved. The water droplet contact angle as above is obtained when, for example, the resin material contains a hydrophilic group. As the hydrophilic group, there can be cited, for example, a hydroxyl group, an amino group, a carboxyl group, a sulfo group, and an amide group.

The hydrophilic group is introduced into the resin material by using, for example, a resin containing the hydrophilic group, as the resin used for manufacturing the resin material. The resin containing the hydrophilic group is only required to contain at least one hydrophilic group in a molecule, and when the resin contains recurring units in the molecule, it is preferable that each of the recurring units contains at least one hydrophilic group.

In the erosion resistant material 20, it is more preferable that the water droplet contact angle on a surface 20a with which the colliding particle 40 collides, namely, a surface 20a having the continuous portion 21 and the discontinuous portions 22, is 80 degrees or less. To set the water droplet contact angle on the surface 20a to 80 degrees or less, further improves the erosion resistance.

An average particle diameter of the particles forming the discontinuous portions 22 is preferably 10 µm or less, more preferably 7 µm or less, still more preferably 6 µm or less, and particularly preferably 0.5 µm or less. Although a lower limit value of the average particle diameter is not particularly limited, it is normally about 10 nm.

The surface hardness of the material forming the discontinuous portions 22 is, based on the Rockwell hardness (M scale), preferably 130 or less, and more preferably 100 or less.

The Young's modulus of the material forming the discontinuous portions 22 is preferably 100 MPa or less, more preferably 10 MPa or less, still more preferably 5 MPa or less, and particularly preferably 3 MPa or less. Although a lower limit value of the Young's modulus of the material forming the discontinuous portions 22 is not necessarily limited, it is normally about 0.1 MPa.

A composing material of the discontinuous portions 22 is preferably a material having rubber elasticity, and is preferably core shell rubber, solid rubber, liquid rubber, or the like.

A content proportion of the discontinuous portions 22, in the total of the continuous portion 21 and the discontinuous portions 22, is preferably 1 vol % or more, more preferably 5 vol % or more, still more preferably 10 vol % or more, and particularly preferably 15 vol % or more. Further, the content proportion of the discontinuous portions 22, in the total of the continuous portion 21 and the discontinuous portions 22, is preferably 40 vol % or less, more preferably 35 vol % or less, and still more preferably 30 vol % or less.

Further, it is also possible that both of a first material formed of particles whose average particle diameter is 1 μm or less and having the surface hardness and the Young's modulus higher than those of the continuous portion 21 (the discontinuous portions 12 of the erosion resistant material 10 of the first embodiment), and a second material formed of particles whose average particle diameter is 20 μm or less and having the surface hardness and the Young's modulus lower than those of the continuous portion 21 (the discontinuous portions 22 of the erosion resistant material 20 of the second embodiment), are contained as the discontinuous portions 22. In this case, it is desirable that the first material is contained at 5 to 30 vol %, and the second material is contained at 5 to 30 vol %. More preferably, it is desirable that the proportion of the first material is set to 5 to 20 vol %, and the proportion of the second material is set to 5 to 20 vol %, to thereby set the proportion of the discontinuous portions as a whole to 40 vol % or less.

Although not illustrated, the erosion resistant material 20 can contain fibers, in a similar manner to the erosion resistant material 10 of the first embodiment. A kind of the fibers, a content proportion and the like of the fibers when the fibers are contained, are similar to those of the erosion resistant material 10 of the first embodiment.

Each of the erosion resistant materials of the first and second embodiments can be manufactured in the following manner, for example. First, a resin forming the continuous portion, particles forming the discontinuous portions, and a curing agent, a leveling agent, a defoaming agent, a pigment, a dispersion medium, or the like, according to need, are mixed to prepare a raw material mixture. Thereafter, the mixture is cured. Consequently, it is possible to manufacture each of the erosion resistant materials of the first and second embodiments. Further, it is also possible that the raw material mixture is impregnated with a base material formed of a woven or non-woven fabric, and then subjected to curing. This makes it possible to manufacture the erosion resistant material containing fibers inside the continuous portion.

For example, when an epoxy resin is used, an amine-based curing agent, an acid anhydride-based curing agent, an imidazole-based curing agent, a polymercaptan-based curing agent, a phenolic curing agent, a Lewis acid-based curing agent, an isocyanate-based curing agent, or the like, is used as an epoxy resin curing agent.

As the amine-based curing agent, there can be cited, for example, ethylenediamine, 1,3-diaminopropane, 1,4-diaminobutane, hexamethylenediamine, dipropylenediamine, polyetherdiamine, 2,5-dimethylhexamethylenediamine, trimethylhexamethylenediamine, diethylenetriamine, iminobispropylamine, bis(hexamethyl)triamine, triethylenetetramine, tetraethylenepentamine, pentaethylenehexamine, aminoethylethanolamine, tri(methylamino)hexane, dimethylaminopropylamine, diethylaminopropylamine, methyliminobispropylamine, menthanediamine, isophoronediamine, bis(4-amino-3-methyldicyclohexyl)methane, diaminodicyclohexylmethane, bis(aminomethyl)cyclohexane, N-aminoethylpiperazine, 3,9-bis(3-aminopropyl)2,4,8,10-tetraoxaspiro(5,5)undecane, m-xylenediamine, meta-phenylenediamine, diaminodiphenylmethane, diaminodiphenylsulfone, diaminodiethyldiphenylmethane, dicyandiamide, organic acid dihydrazide, and the like.

As the acid anhydride-based curing agent, there can be cited, for example, dodecenyl succinic anhydride, polyadipic anhydride, polyazelaic polyanhydride, polysebacic anhydride, poly(ethyl octadecanedioic) anhydride, poly (phenyl hexadecanedioic) anhydride, methyltetrahydrophthalic anhydride, methylhexahydrophthalic anhydride, methylhimic anhydride, hexahydrophthalic anhydride, tetrahydrophthalic anhydride, trialkyltetrahydrophthalic anhydride, methylcyclohexenedicarboxylic anhydride, phthalic anhydride, trimellitic anhydride, pyromellitic anhydride, benzophenone tetracarboxylic acid, ethylene glycol bistrimellitate, glycerol tristrimellitate, Het anhydride, tetrabromophthalic anhydride, nadic anhydride, methyl nadic anhydride, polyazelaic anhydride, and the like.

As the imidazole-based curing agent, there can be cited, for example, 2-methylimidazole, 2-ethyl-4-methylimidazole, 2-heptadecylimidazole, and the like. Further, as concrete examples of the polymercaptan-based curing agent, there can be cited polysulfide, thioester, and the like.

A compounding amount of the epoxy resin curing agent is appropriately set within a range of effective amount in accordance with the kind of the curing agent and the like, and generally, it is preferably one-half to two equivalents with respect to an epoxy equivalent of the epoxy resin. When the compounding amount is less than one-half equivalents, there is a possibility that a curing reaction of the epoxy resin does not sufficiently progress. On the other hand, when the compounding amount exceeds two equivalents, heat resistance and the like of the erosion resistant material 10 may deteriorate.

Further, it is also possible to use an epoxy resin curing accelerator for accelerating or controlling the curing reaction of the epoxy resin. For example, when an acid anhydride-based curing agent is used, since a curing reaction of the agent is slower than that of another curing agent such as the amine-based curing agent, it is preferable to use the epoxy resin curing accelerator. As a curing accelerator for acid anhydride-based curing agent, there can be cited tertiary amine or salt thereof, quaternary ammonium compound, imidazole, alkali metal alkoxide, and the like.

Further, as a dispersion medium, it is possible to use a reactive solvent or a non-reactive solvent. The reactive solvent is a solvent having reactivity with respect to the epoxy resin curing agent, and as the solvent, there can be cited an organic compound containing one or more of epoxy group per one molecule, and the like. With the use of the reactive solvent, since the solvent reacts with the epoxy resin curing agent to be taken into the cured product of epoxy resin, resulting in that the reduction in the heat resistance and the like is suppressed.

As the reactive solvent, there can be cited, for example, butyl glycidyl ether, alkylene monoglycidyl ether, alkylphenol monoglycidyl ether, polypropylene glycol diglycidyl ether, alkylene diglycidyl ether, and the like.

As the non-reactive solvent, there can be cited, for example, toluene, xylene, benzene, acetone, methyl ethyl ketone, methyl isobutyl ketone, methanol, ethanol, propanol, isopropanol, propyl alcohol, isopropyl alcohol, hexane, cyclohexane, cyclopentane, N-methyl-2-pyrrolidone, dimethylformamide, dimethyl sulfoxide, ethyl acetate, acetonitrile, diethyl ether, tetrahydrofuran, carbon tetrachloride, dichloromethane, chloroform, chlorobenzene, and the like.

A compounding amount of the dispersion medium is preferably 1 to 100 parts by mass with respect to 100 parts by mass of the epoxy resin, for example. When the compounding amount is 1 part by mass or more, dispersibility of fillers to be the discontinuous portions 12 can be sufficiently enhanced. On the other hand, when the compounding amount is 100 parts by mass or less, the heat resistance and the like can be secured.

Figure 5:
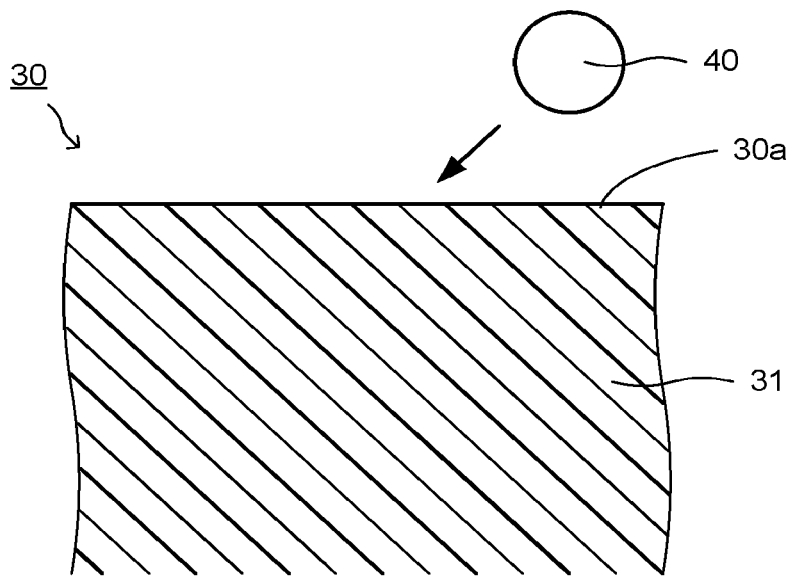
FIG. 5 is a sectional view illustrating one example of an erosion resistant material of a third embodiment.

Next, an erosion resistant material of a third embodiment will be described. FIG. 5 is a sectional view illustrating one example of the erosion resistant material of the third embodiment.

An erosion resistant material 30 of the third embodiment has a resin material portion 31. A resin material forming the resin material portion 31 has a hydrophilic group. Further, a water droplet contact angle on a surface of the resin material forming the resin material portion 31 is 80 degrees or less.

According to the erosion resistant material 30, since the material has the resin material in which the water droplet contact angle on the surface thereof becomes 80 degrees or less because of the presence of hydrophilic group, the erosion resistance becomes good. As the hydrophilic group, there can be cited a hydroxyl group, an amino group, a carboxyl group, a sulfo group, and an amide group, for example. The water droplet contact angle is preferably 75 degrees or less, and more preferably 70 degrees or less, since the erosion resistance becomes good. A lower limit value of the water droplet contact angle is not particularly limited, and although it may be 0 degrees, normally, it is enough if the angle is about 60 degrees.

As the resin material, one containing a resin containing a hydrophilic group is preferable. As the resin containing the hydrophilic group, at least one kind selected from an epoxy resin, a phenol resin, a polyimide resin, and a polyester imide resin each containing the hydrophilic group, is preferable. As the resin containing the hydrophilic group, the epoxy resin containing the hydrophilic group is particularly preferable. The resin containing the hydrophilic group is only required to contain at least one hydrophilic group in a molecule, and when the resin contains recurring units in the molecule, it is preferable that each of the recurring units contains at least one hydrophilic group. Note that it is also possible that the resin material contains a curing agent, a dispersion medium, a leveling agent, a defoaming agent, a pigment, or the like, according to need.

The erosion resistant material 30 may be one which is solely formed of the resin material portion 31, and although not illustrated, the material may also be one containing fibers inside the resin material portion 31. As a material forming the fiber, there can be cited a glass fiber, a carbon fiber, and a polymer fiber, for example.

When the fibers are contained, a content proportion of the fibers in the whole erosion resistant material 30, is preferably 50 vol % or more, more preferably 60 vol % or more, and still more preferably 70 vol % or more. On the other hand, when the content proportion of the fibers is increased, the erosion resistance is easily lowered, so that the content proportion of the fibers in the whole erosion resistant material 30, is preferably 99 vol % or less, and more preferably 95 vol % or less.

The erosion resistant material 30 may also contain discontinuous portions 12 such as those in the erosion resistant material 10 of the first embodiment, inside the resin material portion 31. In this case, the erosion resistant material 30 has a structure similar to that of the erosion resistant material 10 of the first embodiment. Specifically, the resin material portion 31 becomes the continuous portion 11 in the erosion resistant material 10 of the first embodiment. Favorable characteristic, composing material, content proportion and the like of the discontinuous portions 12 when the discontinuous portions 12 are contained, are similar to those of the erosion resistant material 10 of the first embodiment.

Further, the erosion resistant material 30 may also contain discontinuous portions 22 such as those in the erosion resistant material 20 of the second embodiment, inside the resin material portion 31. In this case, the erosion resistant material 30 has a structure similar to that of the erosion resistant material 20 of the second embodiment. Specifically, the resin material portion 31 becomes the continuous portion 21 in the erosion resistant material 20 of the second embodiment. Favorable characteristic, composing material, content proportion and the like of the discontinuous portions 22 when the discontinuous portions 22 are contained, are similar to those of the erosion resistant material 20 of the second embodiment.

Also in the case where the discontinuous portions 12 such as those in the erosion resistant material 10 of the first embodiment or the discontinuous portions 22 such as those in the erosion resistant material 20 of the second embodiment are contained, the water droplet contact angle on a surface 30a preferably becomes 80 degrees or less. Here, the surface 30a indicates a surface 30a, in the erosion resistant material 30, with which the colliding particle 40 collides. Specifically, the surface 30a is a surface having the resin material portion 31, and the discontinuous portions 12 or the discontinuous portions 22. To set the water droplet contact angle on the surface 30a to 80 degrees or less, further improves the erosion resistance.

The erosion resistant material 30 can be manufactured in the following manner, for example. First, a resin containing a hydrophilic group, and a curing agent, a leveling agent, a defoaming agent, a pigment, a dispersion medium, or the like, according to need, are mixed to prepare a raw material mixture. Thereafter, the mixture is cured. Consequently, it is possible to manufacture the erosion resistant material 30. Further, it is also possible that the raw material mixture is impregnated with a base material formed of a woven or non-woven fabric, and then subjected to curing. This makes it possible to manufacture the erosion resistant material 30 containing fibers. Note that regarding components of the curing agent and the like, the components described above can be employed.

The application of the erosion resistant material of each of the embodiments is not particularly limited to one in which a colliding particle may collide with the material at a high speed. The colliding particle may be one made of either solid or liquid. As the application of the erosion resistant material of each of the embodiments as above, there can be cited, for example, an industrial equipment such as a turbine generator or a nuclear equipment, a transport equipment such as an aircraft, an automobile, or a railroad, and various structural members forming a building or the like. The erosion resistant material of each of the embodiments is used as a whole structural member as above or a part of the structural member as above. When the material is used as a part of the structural member, it is used as coating which coats and protects a surface, for example.

For example, in the vicinity of a final stage in a low-pressure turbine of a steam turbine, a water droplet is easily generated due to a reduction of steam pressure. The water droplet collides with a turbine blade due to steam flow, to erode the turbine blade. By using the erosion resistant material of each of the embodiments for the whole part or a part of the turbine blade as above, it is possible to suppress the erosion caused by the collision of water droplet while realizing weight reduction.

EXAMPLES

Hereinafter, embodiments of the present invention will be described in detail while referring to the drawings.

Example 1

An evaluation material having a continuous portion formed of a cured product of bisphenol A type epoxy resin (surface hardness: 100 based on Rockwell hardness (M scale), Young's modulus: 3 GPa), and discontinuous portions formed of tungsten oxide particles (surface hardness: 1300 based on Vickers hardness, Young's modulus: 500 GPa), with a proportion of the discontinuous portions in the continuous portion and the discontinuous portions changed in a range of 5 to 40 vol %, was manufactured. The evaluation material has the configuration of the erosion resistant material of the first embodiment.

Note that the evaluation material is formed of the continuous portion and the discontinuous portions, and does not contain fibers. A particle diameter of the tungsten oxide particle forming the discontinuous portion is about 100 nm. The bisphenol A type epoxy resin is manufactured through a condensation reaction between bisphenol A and epichlorohydrin, and has a recurring unit formed of bisphenol A and epichlorohydrin, in which a hydroxyl group as a hydrophilic group is contained in the recurring unit.

Further, when a water droplet contact angle on a surface of the material forming the continuous portion was measured, it was 88 degrees. Here, the measurement of the water droplet contact angle was conducted in the following manner. First, the evaluation material was cut into a 100 mm square, and after that, the material was held in an environment of 50% of humidity and 55° C. of temperature for 12 hours, and then held in an environment of the same humidity and 25° C. of temperature for 12 hours. After that, the evaluation material was placed in a contact angle meter (CA-2 model) manufactured by Kyowa Interface Science Co., Ltd., water of 2 µl was dropped onto a surface of the evaluation material, and a contact angle of the water droplet was measured.

The erosion resistance of the evaluation material as above was evaluated. In the evaluation, a large number of glass beads each having a particle diameter of about 200 nm, as colliding particles, were made to collide with the evaluation material at a gas pressure of 0.5 MPa. Further, a reduction in volume of the evaluation material (calculated by dividing mass by specific gravity) was measured as an erosion amount. Note that the evaluation was conducted regarding two cases, including a case where an incident angle of the colliding particle was set to 30 degrees, and a case where the incident angle of the colliding particle was set to 90 degrees. The incident angle was set to 0 degrees when it was parallel to the surface of the evaluation material, and the incident angle was set to 90 degrees when it was perpendicular to the surface of the evaluation material. Results thereof are presented in FIG. 6.

Figure 6:
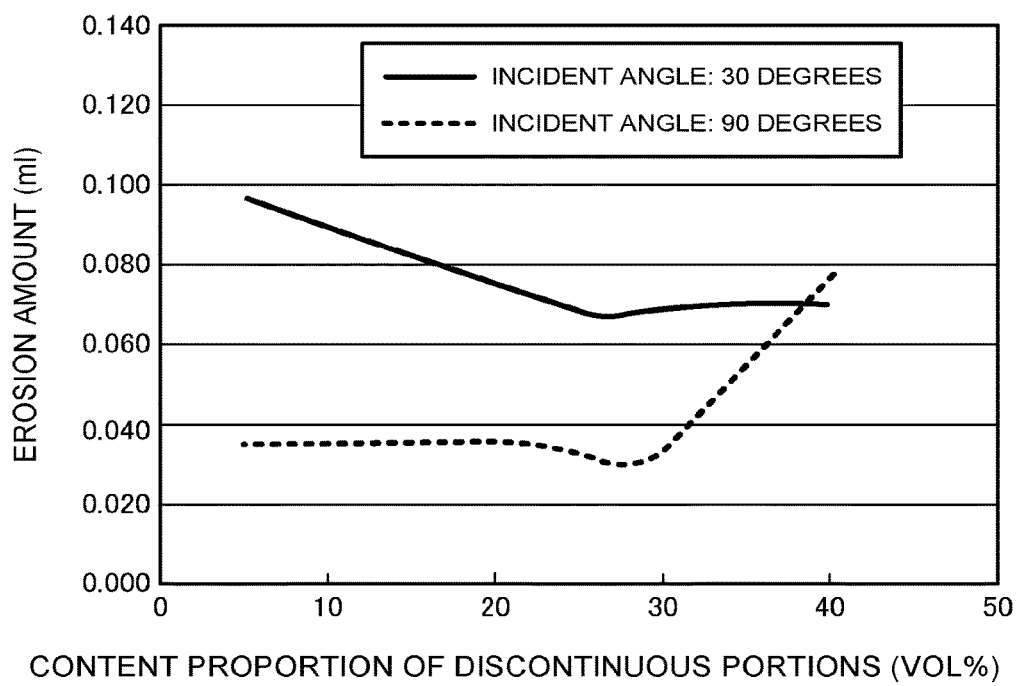
FIG. 6 is a view illustrating a relationship between a content proportion of discontinuous portions (tungsten oxide particles) and an erosion amount.

As is apparent from FIG. 6, when the incident angle is 30 degrees, the erosion amount is decreased as the content proportion of the discontinuous portions increases. However, when the content proportion exceeds 30 vol %, the erosion amount does not decrease anymore. On the other hand, when the incident angle is 90 degrees, the erosion amount rapidly increases after the content proportion of the discontinuous portions exceeds 30 vol %.

It can be estimated that the above results are obtained based on the following reasons.

When the incident angle is small, the erosion such as one formed by scratching mainly occurs. It can be estimated that when the content proportion of the discontinuous portions increases, the number of the discontinuous portions which appear on the surface of the evaluation material is increased, and the erosion amount is decreased because of the discontinuous portions appeared on the surface. However, when the content proportion of the discontinuous portions exceeds 30 vol %, the number of the discontinuous portions which appear on the surface of the evaluation material does not increase anymore. For this reason, it can be estimated that the erosion amount does not decrease anymore.

On the other hand, when the incident angle is large, the impact applied to the discontinuous portions is absorbed by the continuous portion. Accordingly, it can be estimated that the erosion amount decreases. However, when the content proportion of the discontinuous portions exceeds 30 vol %, an interval between mutual particles forming the discontinuous portions becomes short, and an amount of the discontinuous portion interposed between these particles becomes small. For this reason, it can be estimated that the impact is not sufficiently absorbed, resulting in that a structure vulnerable to the impact is created.

Connection of particles is called as a percolation phenomenon. A volume proportion when particles are connected, namely, a percolation threshold value, is theoretically about 31% in a random system. There is a possibility that the erosion amount when the incident angle is large is consistent with the value.

From the above description, it can be understood that the content proportion of the discontinuous portions in the continuous portion and the discontinuous portions is preferably 40 vol % or less. Accordingly, it is possible to reduce the amount of erosion caused by scratching when the incident angle is small. Further, it is possible to reduce the amount of erosion caused by the impact when the incident angle is large. Furthermore, since the portion resistant to the scratching and the portion resistant to the impact are properly arranged over the entire structural member, the erosion resistance in the entire structural member becomes good.

Example 2

As is also apparent from the results of example 1, when the content proportion of the discontinuous portions increases, the erosion amount when the incident angle is large increases. As one of main causes thereof, it can be estimated that bonding strength between the continuous portion and the discontinuous portion is weak, and breaking occurs at an interface between the portions. Accordingly, in order to increase the bonding strength between the continuous portion and the discontinuous portion, the aspect ratio of the particles forming the discontinuous portions was changed to increase an area of the interface, to thereby attempt to reduce the erosion amount.

As an evaluation material, one having a continuous portion formed of a cured product of bisphenol A type epoxy resin (surface hardness: 100 based on Rockwell hardness (M scale), Young's modulus: 3 GPa), and discontinuous portions formed of spherical tungsten oxide particles (surface hardness: 1300 based on Vickers hardness, Young's modulus: 500 GPa) each having a particle diameter of about 100 nm, flat silicate particles (surface hardness: 500 based on Vickers hardness, Young's modulus: 100 GPa) each having a thickness of about several nm and a radius of about 100 nm, or columnar titanium oxide particles (surface hardness: 1600 based on Vickers hardness, Young's modulus: 300 GPa) each having a diameter of about 15 nm and a length of about 20 to 100 nm, with a content proportion of the discontinuous portions in the continuous portion and the discontinuous portions of 20 vol %, was manufactured. Note that, in accordance with the kinds of the particles, three kinds of a spherical tungsten oxide composite resin, a flat silicate composite resin, and a columnar titanium oxide composite resin, were prepared as the evaluation materials.

The erosion resistance of these evaluation materials was evaluated. In the evaluation, a large number of glass beads (solid) each having a particle diameter of about 100 nm, or a large number of water droplets (liquid) each having a particle diameter of about 180 as colliding particles, were made to collide with the evaluation materials under conditions of a gas pressure of 0.5 MPa and an incident angle of the colliding particles of 90 degrees. Further, a reduction in mass of each of the evaluation materials was measured as an erosion amount. Further, for the comparison, similar measurement was conducted with respect to a material which does not contain the discontinuous portions and thus is solely formed of the continuous portion (non-composite resin). Results thereof are presented in FIG. 7.

Figure 7:
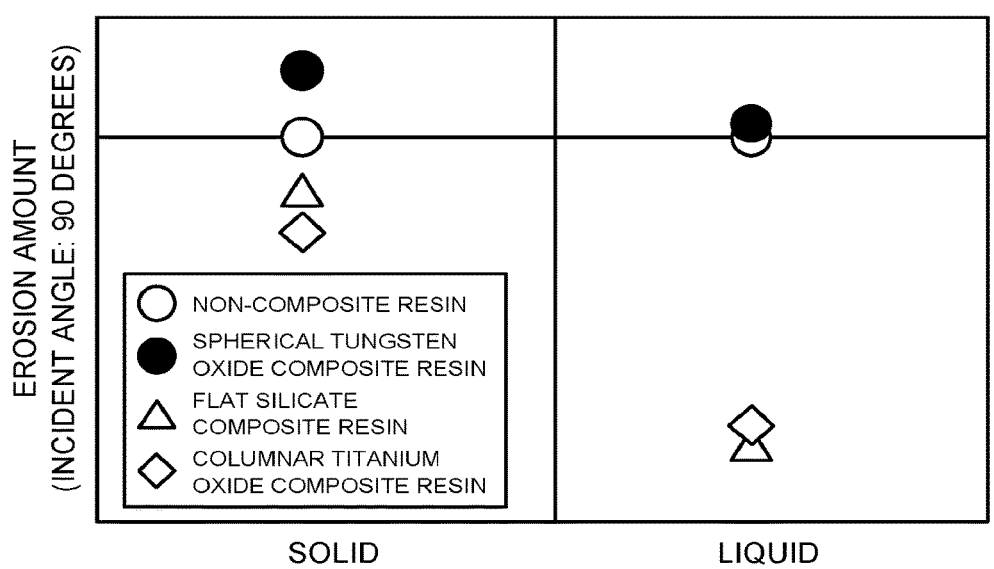
FIG. 7 is a view illustrating a relationship between shapes of particles forming discontinuous portions and an erosion amount.

As is apparent from FIG. 7, in the flat silicate composite resin and the columnar titanium oxide composite resin each having the large aspect ratio of the particles forming the discontinuous portions, the erosion amount when the incident angle is large is lowered, when compared to the non-composite resin or the spherical tungsten oxide composite resin.

Example 3

A plurality of evaluation materials each having a continuous portion formed of a cured product of bisphenol A type epoxy resin (surface hardness: 100 based on Rockwell hardness (M scale), Young's modulus: 3 GPa), and discontinuous portions formed of core shell rubber particles (surface hardness: 60 based on Shore A hardness, Young's modulus: 1 MPa), with a content proportion of the discontinuous portions in the continuous portion and the discontinuous portions changed in a range of 5 to 40 vol %, were manufactured. Each of the evaluation materials has the configuration of the erosion resistant material of the second embodiment. Note that each of the evaluation materials is formed of the continuous portion and the discontinuous portions, and does not contain fibers. Further, the particle forming the discontinuous portion has a particle diameter of about 500 nm.

The erosion resistance of the evaluation materials as above was evaluated. In the evaluation, a large number of water droplets each having a particle diameter of about 180 μm, as colliding particles, were made to collide with the evaluation materials at about 240 m/sec. Further, a reduction in mass of each of the evaluation materials was measured as an erosion amount. The evaluation was conducted by setting the incident angle of the colliding particles to 30 to 90 degrees. Results thereof are presented in FIG. 8. Note that FIG. 8 also presents results regarding materials each of which is solely formed of the continuous portion and does not contain the discontinuous portions.

Figure 8:
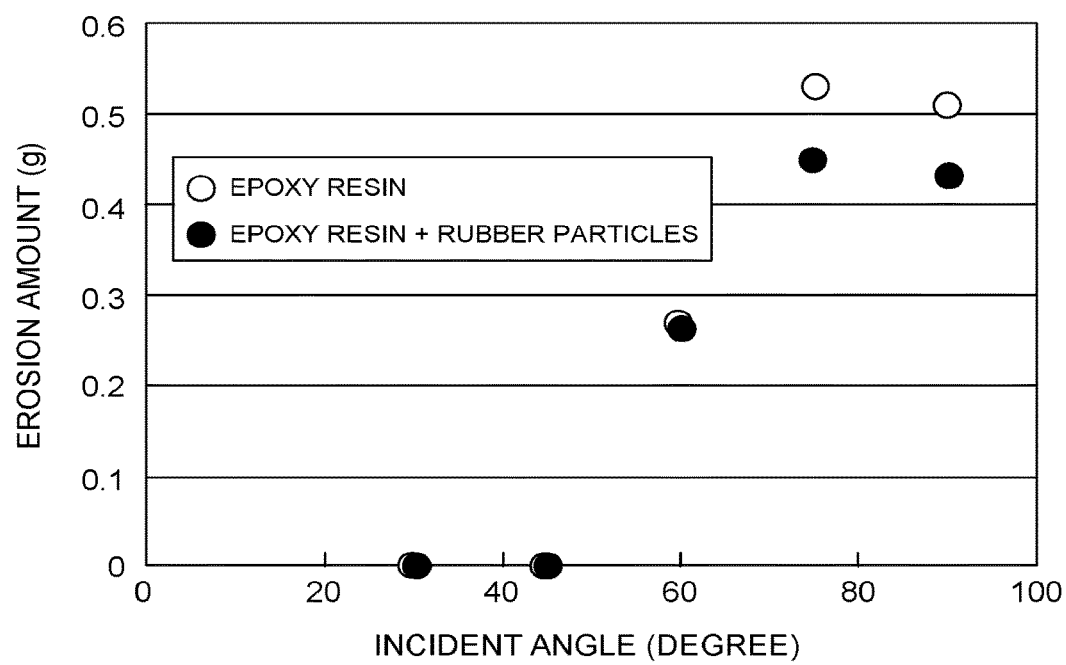
FIG. 8 is a view illustrating a relationship between a content proportion of discontinuous portions (rubber particles) and an erosion amount.

As is also apparent from FIG. 8, also when the discontinuous portions are formed of the material having the surface hardness and the Young's modulus lower than those of the continuous portion, the erosion resistance becomes good, in a similar manner to the case where the discontinuous portions are formed of the material having the surface hardness and the Young's modulus higher than those of the continuous portion. In particular, as is apparent from FIG. 8, when the discontinuous portions are formed of the material having the surface hardness and the Young's modulus lower than those of the continuous portion, the erosion resistance becomes good when the incident angle is on the high angle side such as 75 degrees or 90 degrees.

Examples 4 to 7, Comparative Examples 1 and 2

As an evaluation material of example 4, one obtained by curing an ester-acrylic monomer resin containing at least a hydroxyl group as a hydrophilic group, and having a water droplet contact angle on a surface thereof of 47 degrees, was prepared.

As an evaluation material of example 5, one obtained by curing an epoxy-phenol resin containing at least a hydroxyl group as a hydrophilic group, and having a water droplet contact angle on a surface thereof of 61 degrees, was prepared.

As an evaluation material of example 6, one obtained by curing an epoxy-acid anhydride-acrylic monomer resin containing at least a hydroxyl group as a hydrophilic group, and having a water droplet contact angle on a surface thereof of 67 degrees, was prepared.

As an evaluation material of example 7, one obtained by curing an epoxy-ester-acrylic monomer resin containing at least a hydroxyl group as a hydrophilic group, and having a water droplet contact angle on a surface thereof of 66.5 degrees, was prepared. As an evaluation material of comparative example 1, one obtained by curing an epoxy-amine resin containing no hydrophilic group, and having a water droplet contact angle on a surface thereof of 71.5 degrees, was prepared.

As an evaluation material of comparative example 2, one obtained by curing an epoxy-acid anhydride resin containing no hydrophilic group, and having a water droplet contact angle on a surface thereof of 88 degrees, was prepared.

Note that each of the evaluation materials of the examples 4 to 7 has the configuration of the erosion resistant material of the third embodiment.

Next, the erosion resistance of the evaluation materials of the examples 4 to 7 and the comparative examples 1 and 2 was evaluated. In the evaluation, a large number of water droplets each having a particle diameter of about 200 μm, as colliding particles, were made to collide with the evaluation materials at a speed of about 240 m/second for 20 minutes. Further, a reduction in mass of each of the evaluation materials was measured as an erosion amount. Note that the evaluation was conducted by setting the incident angle of the colliding particles to 75 degrees. Results thereof are presented in FIG. 9.

Figure 9:
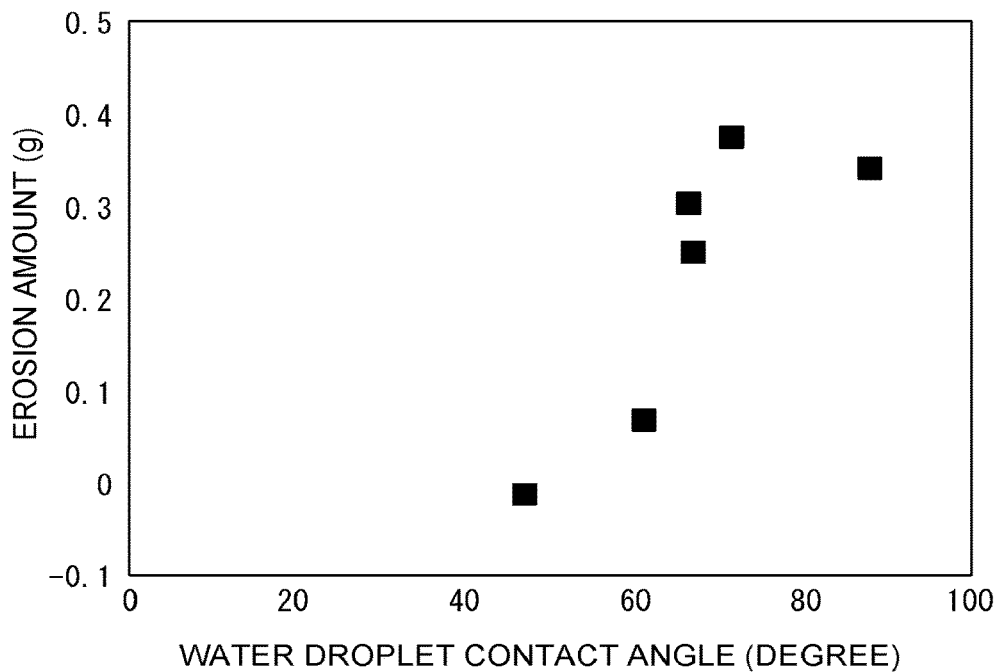
FIG. 9 is a view illustrating a relationship between a water droplet contact angle on a surface and an erosion amount.

As is apparent from FIG. 9, when the resin material has the hydrophilic group, and the water droplet contact angle on the surface of the resin material becomes 80 degrees or less, the erosion amount decreases. Further, within a range in which the water droplet contact angle on the surface of the resin material becomes 80 degrees or less, the erosion amount decreases as the water droplet contact angle becomes small. From the above description, it can be understood that, by providing the resin material in which the water droplet contact angle on the surface thereof is 80 degrees or less, the good erosion resistance can be obtained.

Figure 10:
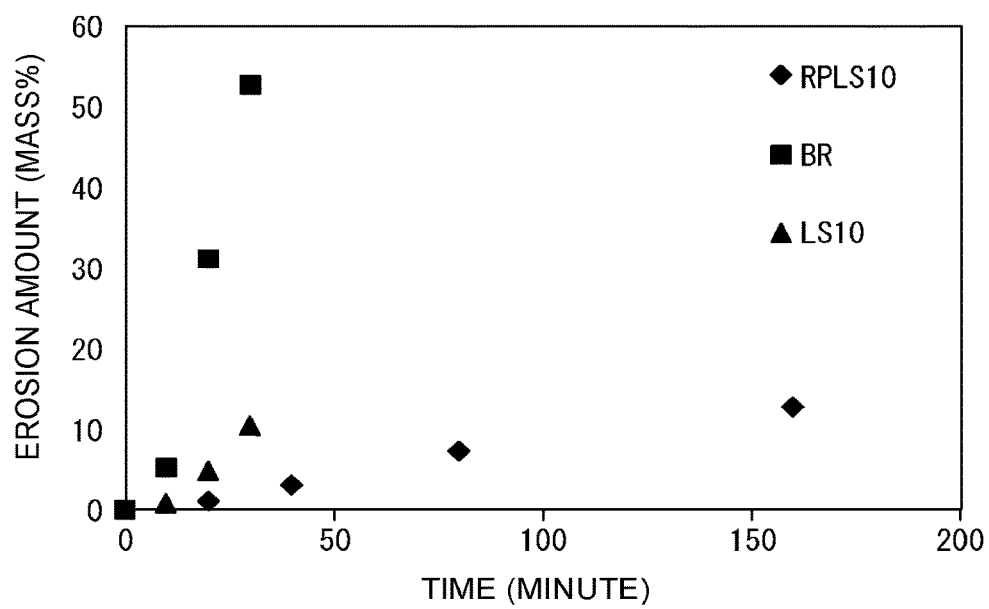
FIG. 10 is a view illustrating a relationship between configurations of discontinuous portions and an erosion amount.

FIG. 10 illustrates a temporal change of an erosion amount at a time of setting an impact angle to 90 degrees. BR indicates a material which is solely formed of an epoxy resin being a comparative example. LS10 indicates a material in which an epoxy resin is used as the continuous portion, and 10 mass % of flat silicate is dispersed as the discontinuous portions. Further, RPLS10 indicates a material in which an epoxy-phenol resin with good wettability is used as the continuous portion, and 10 mass % of flat silicate and 10 mass % of core shell rubber particles are compounded as the discontinuous portions. As is apparent from the drawing, the RPLS10 in which the silicate and core shell rubber particles are dispersed in the resin with high wettability exhibits the highest erosion resistance.

Note that specific gravity of the above-described epoxy resin is 1.1 to 1.2, specific gravity of the above-described flat silicate is 1.2, and specific gravity of the above-described core shell rubber particles is 1.0 to 1.1. Since the specific gravities of the respective components are approximately equal as described above, a proportion of each of the components by mass becomes substantially equal to a proportion of each of the components by volume. Specifically, the above-described LS10 contains about 10 vol % of flat silicate as the discontinuous portions. Further, the RPLS10 contains about 10 vol % of flat silicate and about 10 vol % of core shell rubber particles.

While several embodiments of the present invention have been described above, these embodiments have been presented by way of example, and are not intended to limit the scope of the inventions. The novel embodiments described herein may be implemented in a variety of other forms, and various omissions, substitutions and changes thereof may be made without departing from the spirit of the inventions. Such embodiments and modifications are included in the scope and spirit of the invention, and also included in the inventions described in the accompanying claims and their equivalents.

What is claimed is:

1. An erosion resistant material, comprising: a continuous portion having a continuous structure, the continuous portion including a resin material containing a hydroxyl group, the resin material having a water droplet contact angle of 47 to 67 degrees on a surface thereof; and discontinuous portions arranged inside the continuous portion and being discontinuous with each other, the discontinuous portions including particles of core shell rubber and/or silicate, wherein the particles have a first average particle diameter of 1 μm or less, the resin material includes at least one of an epoxy resin, a phenol resin, a polyimide resin, and a polyester imide resin, the continuous portion has a Young's modulus of 1 GPa or more and 50 GPa or less, and the discontinuous portion has a Young's modulus of 0.1 MPa or more and 100 MPa or less.

2. The erosion resistant material according to claim 1, wherein an average aspect ratio of the particles is 5 or more.

3. The erosion resistant material according to claim 1, wherein a ratio of the discontinuous portions to the total of the continuous portion and the discontinuous portions is not less than 1 vol % nor more than 40 vol%.

4. The erosion resistant material according to claim 1, further comprising fibers inside the continuous portion.

5. The erosion resistant material according to claim 4, wherein the fibers include at least one of a glass fiber, a carbon fiber, and a polymer fiber.

6. The erosion resistant material according to claim 4, wherein the ratio of the fibers to the total of the continuous portion, the discontinuous portions, and the fibers is not less than 1 vol % nor more than 40 vol %.

7. The erosion resistant material according to claim 1, wherein the discontinuous portions include particles of core shell rubber and silicate.

8. The erosion resistant material according to claim 1, wherein a ratio of the continuous portion to a total of the discontinuous portion and the discontinuous portion is 5 to 40 volume %.

9. The erosion resistant material according to claim 1, wherein the resin material further includes at least one of an ester-acrylic monomer resin, an epoxy phenolic resin, an epoxy-acid anhydride-acrylic monomer resin, and an epoxy-ester-acrylic monomer resin.

10. A turbine blade, comprising:
a turbine blade body having a surface; and
a film on the surface, the film including the erosion resistant material according to claim 1.

* * * * *